US008615314B1

(12) United States Patent
Sonderman et al.

(10) Patent No.: US 8,615,314 B1
(45) Date of Patent: Dec. 24, 2013

(54) PROCESS CONTROL USING ANALYSIS OF AN UPSTREAM PROCESS

(75) Inventors: Thomas J. Sonderman, Austin, TX (US); Christopher A. Bode, Austin, TX (US); Alexander J. Pasadyn, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 2756 days.

(21) Appl. No.: 10/932,989

(22) Filed: Sep. 2, 2004

(51) Int. Cl.
*G05B 13/02* (2006.01)

(52) U.S. Cl.
USPC .............................................. 700/31; 700/44

(58) Field of Classification Search
USPC ............. 700/28–31, 44, 45, 47–50, 108–110, 700/117–121, 173, 174; 706/902–904, 906, 706/911, 912, 914
See application file for complete search history.

(56) References Cited

U.S. PATENT DOCUMENTS

| | | | | |
|---|---|---|---|---|
| 5,159,547 A | * | 10/1992 | Chand | 700/37 |
| 5,214,745 A | * | 5/1993 | Sutherland | 706/17 |
| 5,859,964 A | * | 1/1999 | Wang et al. | 714/48 |
| 5,864,773 A | * | 1/1999 | Barna et al. | 702/85 |
| 6,041,270 A | * | 3/2000 | Steffan et al. | 700/121 |
| 6,368,879 B1 | * | 4/2002 | Toprac | 438/5 |
| 6,560,503 B1 | * | 5/2003 | Toprac et al. | 700/108 |
| 6,581,048 B1 | * | 6/2003 | Werbos | 706/23 |
| 6,641,746 B2 | * | 11/2003 | Houge et al. | 216/59 |
| 6,651,226 B2 | * | 11/2003 | Houge et al. | 716/4 |
| 6,740,534 B1 | * | 5/2004 | Adams et al. | 438/14 |
| 6,773,931 B2 | * | 8/2004 | Pasadyn et al. | 438/10 |
| 6,810,296 B2 | * | 10/2004 | Bode et al. | 700/110 |
| 6,912,436 B1 | * | 6/2005 | Jones et al. | 700/121 |
| 6,947,803 B1 | * | 9/2005 | Bode et al. | 700/121 |
| 2006/0048697 A1 | * | 3/2006 | Houge et al. | 117/11 |
| 2006/0231752 A1 | * | 10/2006 | Houge et al. | 250/306 |

* cited by examiner

*Primary Examiner* — M. N. Von Buhr
(74) *Attorney, Agent, or Firm* — Williams, Morgan & Amerson, P.C.

(57) ABSTRACT

A method, apparatus and a system, for performing a process control using analysis of an upstream process is provided. The method comprises performing a first process on a workpiece and performing a qualitative analysis upon the workpiece relating to the first process, the qualitative analysis comprises analyzing at least one metrology measurement relating to the first process and a workpiece feature to evaluate a characteristic of the workpiece. The method further comprises selecting a process control parameter for performing a second process upon the workpiece based upon the qualitative analysis.

47 Claims, 6 Drawing Sheets

PROCESS CONTROL USING ANALYSIS OF AN UPSTREAM PROCESS

BACKGROUND OF THE INVENTION

1. Field of the Invention

This invention relates generally to semiconductor manufacturing, and, more particularly, to a method, system, and apparatus for performing process control on a downstream process based upon analysis of an upstream process.

2. Description of the Related Art

The technology explosion in the manufacturing industry has resulted in many new and innovative manufacturing processes. Today's manufacturing processes, particularly semiconductor manufacturing processes, call for a large number of important steps. These process steps are usually vital, and therefore, require a number of inputs that are generally fine-tuned to maintain proper manufacturing control.

The manufacture of semiconductor devices requires a number of discrete process steps to create a packaged semiconductor device from raw semiconductor material. The various processes, from the initial growth of the semiconductor material, the slicing of the semiconductor crystal into individual wafers, the fabrication stages (etching, doping, ion implanting, or the like), to the packaging and final testing of the completed device, are so different from one another and specialized that the processes may be performed in different manufacturing locations that contain different control schemes.

Generally, a set of processing steps is performed across a group of semiconductor wafers, sometimes referred to as a lot. For example, a process layer that may be composed of a variety of different materials may be formed across a semiconductor wafer. Thereafter, a patterned layer of photoresist may be formed across the process layer using known photolithography techniques. Typically, an etch process is then performed across the process layer using the patterned layer of photoresist as a mask. This etching process results in the formation of various features or objects in the process layer. Such features may be used as, for example, a gate electrode structure for transistors. Many times, trench isolation structures are also formed in various regions of the semiconductor wafer to create electrically isolated areas across a semiconductor wafer. One example of an isolation structure that can be used is a shallow trench isolation (STI) structure.

The manufacturing tools within a semiconductor manufacturing facility typically communicate with a manufacturing framework or a network of processing modules. Each manufacturing tool is generally connected to an equipment interface. The equipment interface is connected to a machine interface to which a manufacturing network is connected, thereby facilitating communications between the manufacturing tool and the manufacturing framework. The machine interface can generally be part of an advanced process control (APC) system. The APC system initiates a control script, which can be a software program that automatically retrieves the data needed to execute a manufacturing process.

Figure 1:
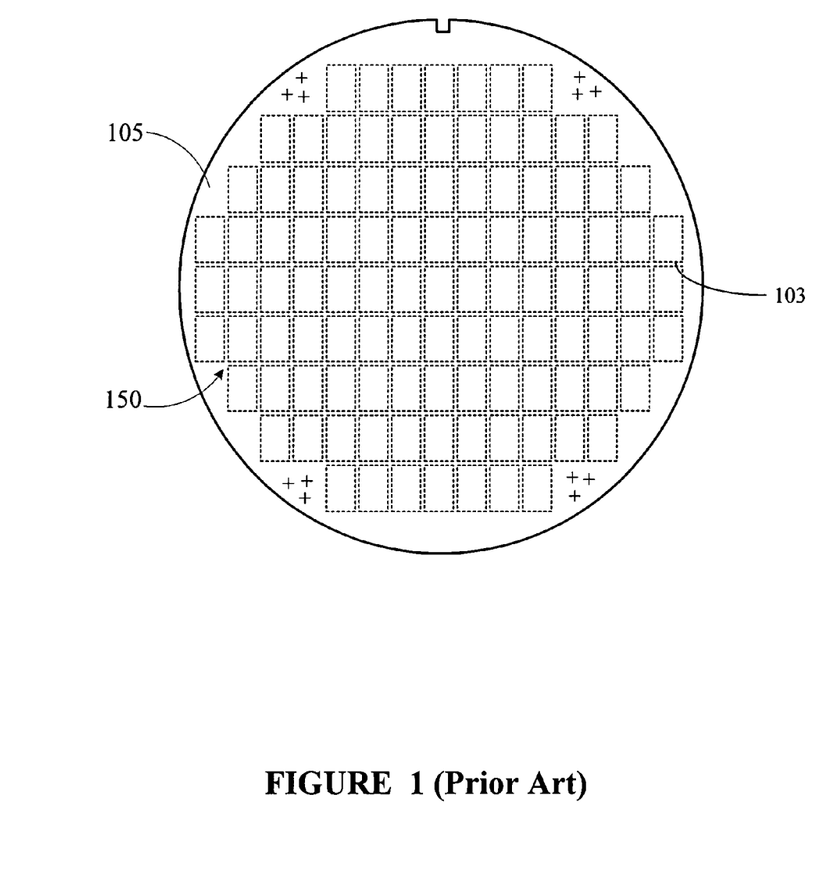
FIG. 1 is a simplified diagram of a prior art semiconductor wafer being processed.

FIG. 1 illustrates a typical semiconductor wafer 105. The semiconductor wafer 105 typically includes a plurality of individual semiconductor die 103 arranged in a grid 150. Using known photolithography processes and equipment, a patterned layer of photoresist may be formed across one or more process layers that are to be patterned. As part of the photolithography process, an exposure process is typically performed by a stepper on approximately one to four die 103 locations at a time, depending on the specific photomask employed. The patterned photoresist layer can be used as a mask during etching processes, wet or dry, performed on the underlying layer or layers of material, e.g., a layer of polysilicon, metal, or insulating material, to transfer the desired pattern to the underlying layer. The patterned layer of photoresist is comprised of a plurality of features, e.g., line-type features or opening-type features that are to be replicated in an underlying process layer. Additionally, an ion implant process may be performed on the semiconductor wafer 105 to form various doped regions in the semiconducting substrate of the semiconductor wafer 105.

Figure 2:
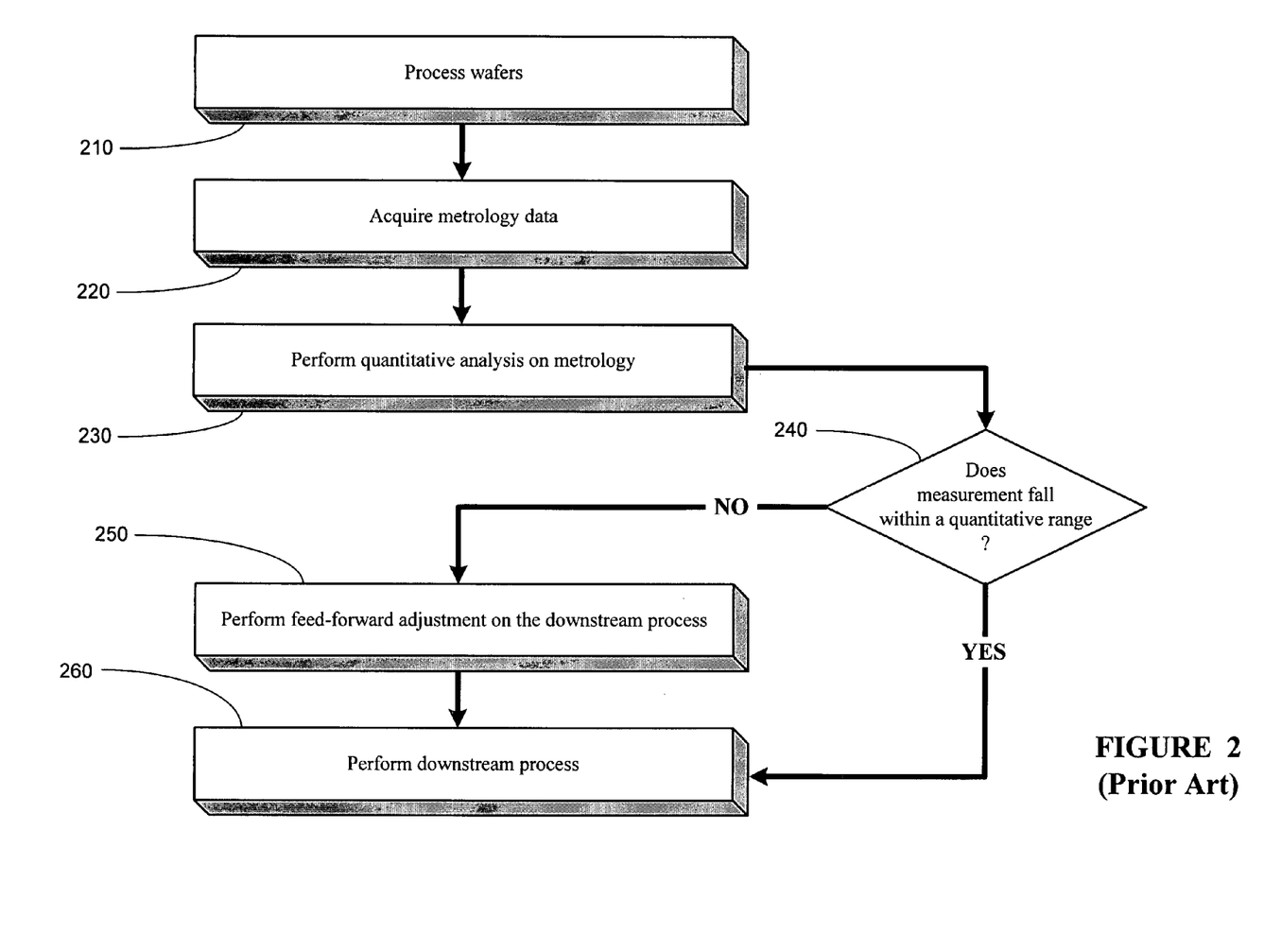
FIG. 2 illustrates a simplified flowchart depiction of a prior art process flow during manufacturing of semiconductor wafers.

When processing semiconductor wafers 105, various process steps are sequentially performed on the semiconductor wafers 105. Errors resulting from one process may be mitigated by adjusting a subsequent process accordingly. This is known as feed-forward control. Turning now to FIG. 2, a flowchart depiction of a state-of-the-art method for performing feed-forward control is illustrated. One or more semiconductor wafers 105 in a wafer lot are processed by a processing system (block 210). Upon processing the semiconductor wafers 105, the processing system acquires metrology data from one or more selected wafers from the wafer lot (block 220). The metrology data may include quantitative measurements of various factors, such as film thickness, trench depth, and the like. Upon acquisition of metrology data, a quantitative analysis is performed on the metrology data (block 230). Often, the quantitative analysis includes a comparison of the quantitative results of the metrology data to predetermined, expected data. Based upon the quantitative analysis, a determination is made whether the measurements relating to the metrology data fall within a quantitative range of acceptable values (block 240). When the process system determines that the measurements do not fall within the predetermined allowable quantitative range, a feed-forward adjustment (block 250) to a subsequent downstream process may be performed to compensate for, or to mitigate, the error discovered on the wafer as a result of the previous process. If it is determined that the measurements do fall within the predetermined allowable quantitative range, then the feed-forward adjustment is not performed and the downstream process may then be performed on the semiconductor wafers 105 (block 260).

Among the problems associated with state-of-the-art methodology includes the fact that the quantitative analysis may not provide for proper feed-forward adjustment to the downstream process. Simply quantitatively examining the values of various measurements may lead to feed-forward adjustments that may cause additional problems or fail to adequately compensate for the previous errors discovered. There may be a variety of factors why a particular metrology parameter may be outside a predetermined desirable range. However, merely evaluating the fact that particular metrology parameters are out of range and performing an adjustment to compensate for that fact may not adequately or efficiently compensate for such an error, or may even cause additional errors. Such errors may lead to a reduction in device performance levels and/or a reduction in production yields.

The present invention is directed to overcoming, or at least reducing, the effects of, one or more of the problems set forth above.

SUMMARY OF THE INVENTION

In one aspect of the present invention, a method of performing process control using analysis of an upstream process is disclosed. In one illustrative embodiment, a method comprises performing a first process on a workpiece and performing a qualitative analysis upon the workpiece relating to the first process, the qualitative analysis comprises analyzing at least one metrology measurement relating to the first process and a workpiece feature to evaluate a characteristic of the workpiece. The method further comprises selecting a process control parameter for performing a second process upon the workpiece based upon the qualitative analysis.

In another illustrative embodiment of the present invention, the method comprises performing a first process on a workpiece and performing a qualitative analysis upon the workpiece relating to the first process, the qualitative analysis comprises analyzing at least one metrology measurement relating to the first process and a workpiece feature to evaluate a characteristic of the workpiece. The method further comprises associating a process recipe to the characteristic of the workpiece and using the process recipe to perform a second process upon the workpiece.

In yet another aspect of the present invention, an apparatus that may be used to perform a process control using analysis of an upstream process is disclosed. In an illustrative embodiment, the apparatus comprises a process controller to analyze metrology measurement relating to a first process performed on a workpiece and a workpiece feature to evaluate a characteristic of the workpiece. The process controller also selects a process control parameter for performing said second process upon said workpiece based upon the characteristic of the workpiece.

In another aspect of the present invention, a system is provided for performing a process control using analysis of an upstream process is disclosed. In an illustrative embodiment, the system comprises a first processing tool to perform a first process upon a workpiece and a metrology tool to acquire metrology data relating to the first process performed on the workpiece to provide at least one metrology measurement. The system further comprises a second processing tool to perform a second process upon the workpiece and a process controller operatively coupled to the first and second processing tools, the process controller to analyze the metrology measurement relating to the first process and a workpiece feature to evaluate a characteristic of the workpiece. The process controller also selects a process control parameter for performing the second process upon the workpiece based upon the characteristic of the workpiece.

In yet another aspect of the present invention, a computer readable program storage device encoded with instructions is provided for performing a process control using analysis of an upstream process is disclosed. The instructions perform a method comprising performing a first process on a workpiece and performing a qualitative analysis upon the workpiece relating to the first process. The qualitative analysis comprises analyzing at least one metrology measurement relating to the first process and a workpiece feature to evaluate a characteristic of the workpiece. The instructions when executed further provide for selecting a process control parameter for performing a second process upon the workpiece based upon the qualitative analysis.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

There are many discrete processes that are involved in semiconductor manufacturing. Many times, workpieces (e.g., semiconductor wafers 105, semiconductor devices, etc.) are stepped through multiple manufacturing process tools. Embodiments of the present invention provide for performing a qualitative analysis of an upstream process and making a feed-forward adjustment to a subsequent downstream process based upon the qualitative analysis. Metrology data from an upstream process may be acquired, which may include various factors associated with the upstream process. A qualitative analysis, which includes analyzing the actual measurement values as well as other factors (e.g., an overall assessment of the patterns on the processed wafers), may be used to characterize the workpiece processed by the upstream process. The qualitative analysis may include consideration of various factors, such as quantitative, numerical factors, non-numerical factors, business rules. The qualitative analysis may include includes abstracting wafer quality characteristics from the metrology data as well as other process characteristics (e.g. an overall assessment of the patterns on the processed wafers,) which may be used to characterize the workpiece 105 processed by the upstream process. The qualitative analysis may include considerations of various factors, such as qualitative descriptions of wafer quality, descriptions of the spatial uniformity of post-process wafer characteristics, aggregation of wafers into like groups based upon the characteristics, business rules, and the like A rule-based or a decision-based logic may be used to perform a qualitative analysis of the overall condition of the semiconductor wafers 105, including one or more patterns on the semiconductor wafers 105. The qualitative analysis may include a judgment or decision type analysis performed by a fuzzy logic controller, a neural network controller, and/or a controller utilizing a qualitative transfer function. The qualitative analysis may then be used to characterize the processed semiconductor wafer. The characterization of the semiconductor wafer may then be grouped into one of a plurality of groupings. The grouping of the semiconductor wafers 105 may then be used to select a set of control parameters or recipes to perform a downstream process.

For example a particular wafer quality characteristic that is measured/examined in five wafer areas: top, bottom, left, right, and center. From these measurements, one or more secondary characteristics may be generated, e.g. top-bottom, left-right, center (average of others) for radial, etc. These characteristics may be non-numerical, but a more general sense of various characteristics across a semiconductor wafer 105.

As an illustrative example performing qualitative analysis, in the context of an etch process, an examination of an incoming photo resist pattern (relating to a photolithography process) may provide an indication of the recipe that should be applied. Critical dimension (CD) measurements, photo resist thickness, line-edge roughness (LER) indications, and the like, may provide an indication that relating to customizing the recipe used to perform a process on the semiconductor wafer 105. Underlying film thicknesses may also play a part, such as in the case of STI trench etch processes, where specific depth is desired. Another factor that may be analyses as part of a qualitative analysis, may include an examination of the time period since the last cleaning of a chamber (of a processing tool, e.g., etch processing tool). This may indicate that a "new" chamber might need a different recipe than an older chamber. Furthermore, in addition to the above-mentioned consideration, various rules may be implemented into the qualitative analysis, e.g. if the age of the chamber is greater than three days, and a particular CD is greater than 80 nanometer, then Recipe A may be used. Utilizing a combination of various rules, and optimizing over them, may provide indication of a proper recipe to be used for a particular process.

In additional or separate from using qualitative analysis of the present invention to select a recipe for a processing tool, a recipe modification may be performed. For example, based upon the qualitative analysis provided herein, a decision to modify a particular recipe may be performed based upon an adjustment factor defined by "−/0/+" adjustment to the previous recipe, where "−" may indicate an reduction of a recipe parameter, "0" may indicate a non-change of a parameter, and "+" may indicate an increase of a recipe parameter.

Additionally, the qualitative analysis may be used to perform a wafer-to-wafer adjustment of process controls (e.g., adjustment of a recipe used for processing a semiconductor wafer 105). Manufacturing data, e.g., metrology data, tool state data, etc., may be collected from any processed wafer or extrapolated for any wafer. A recipe selection or adjustment may be made for each wafer, every other wafer, or any number of wafers associated with a wafer lot. Feedback data from various sensors, endpoint detection systems, or integrated metrology systems may be made on a wafer-to-wafer. A sequence related to the wafer-to-wafer adjustments based upon a qualitative analysis may include processing a wafer, acquiring one or more measurements from the processed wafer, adjusting recipe for processing a semiconductor wafer 105. Furthermore, wafer-level recipes may also be selected or adjusted, where the recipe selection or adjustment is made for each wafer before any are processed by the processing tool.

Figure 3:
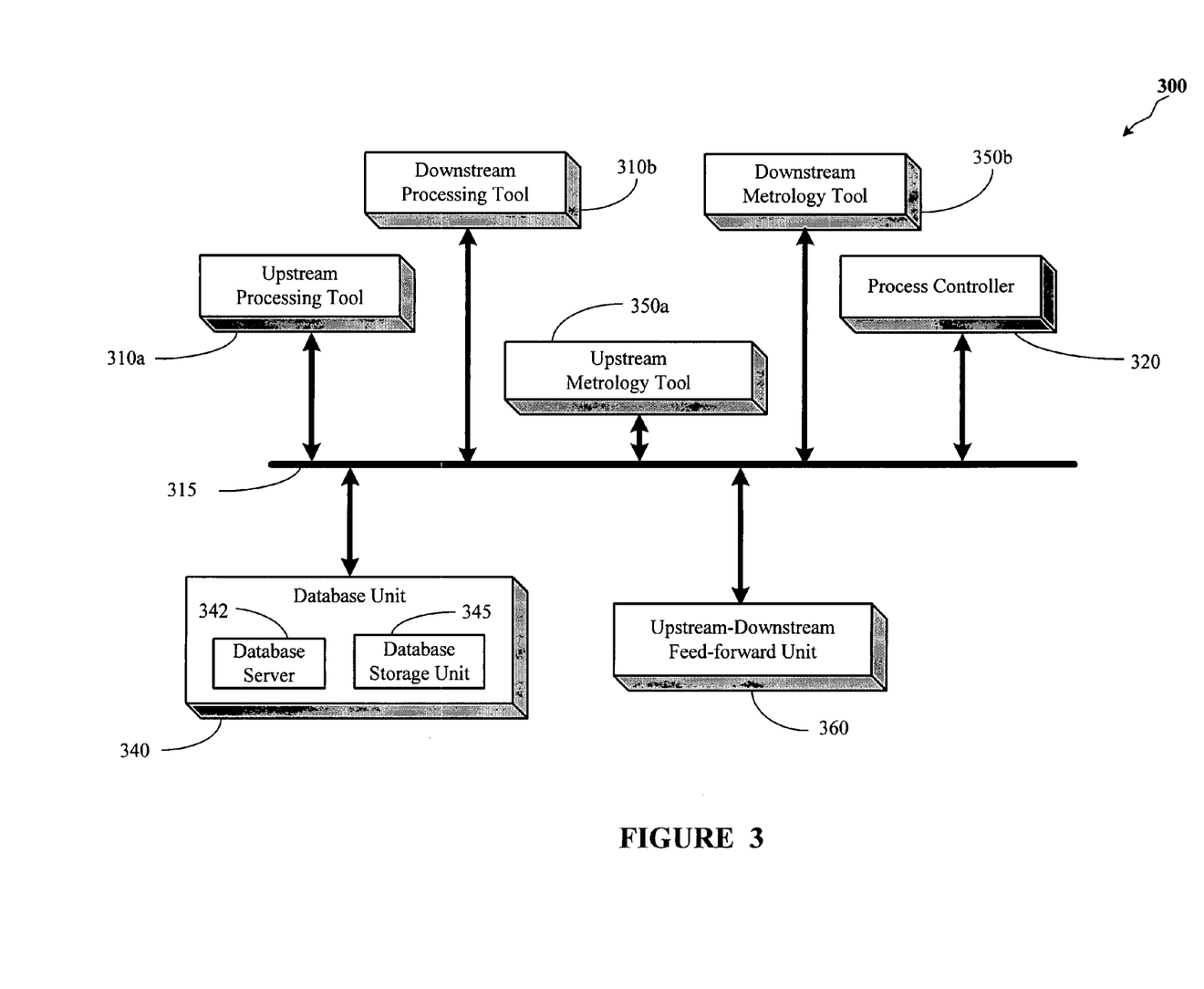
FIG. 3 provides a block diagram representation of a system in accordance with one illustrative embodiment of the present invention.

Turning now to FIG. 3, a block diagram depiction of a system 300 in accordance with illustrative embodiments of the present invention is illustrated. A process controller 320 in the system 300 is capable of controlling various operations relating to an upstream processing tool 310a and a downstream processing tool 310b, which performs a process operation that is a downstream process relative to the process performed by the upstream processing tool 310a. The process controller 320 may comprise a computer system that includes a processor, memory, and various computer-related peripherals. Moreover, although a single process controller 320 is schematically depicted in FIG. 3, in practice, the function performed by the process controller 320 may be performed by one or more computers or workstations spread throughout the manufacturing system.

The upstream and downstream tools may be any of a variety of tools found in modern semiconductor manufacturing facility. For example, the upstream processing tool 310a may be a deposition tool, an etch tool, or the like; and the downstream processing tool 310b may be a polishing tool. In other embodiment, the upstream tool may be a photolithography tool and the downstream tool may be an etch tool. Other upstream/downstream tool combinations may be used in accordance of embodiments of the present invention. The system 300 is capable of acquiring manufacturing related data, such as metrology data, related to processed semiconductor wafers 105. The metrology data may be acquire by any of a variety of metrology tools. For example an illustrative upstream metrology tool 350a acquires data relating to the processes performed by the upstream processing tool 310a. Similarly, an illustrative downstream metrology tool 350b acquires data from the downstream processing tool 310b. The metrology data described herein may also be acquired using integrated metrology stations within a process tool.

The system 300 may also comprise a database unit 340. The database unit 340 may be used to store a plurality of types of data, such as manufacturing-related data, data related to the operation of the system 300 (e.g., the status of the processing tools 310a, 310b, the status of semiconductor wafers 105, etc.). The database unit 340 may also store a plurality of process recipes that correspond with various groupings of characterization of wafers processed by the upstream processing tool 310a. The process recipes may be used by the downstream processing tool 310b to perform a downstream process on the semiconductor wafers 105. The database unit 340 may comprise a database server 342 for storing other manufacturing data related to the processing of semiconductor wafers 105, into a database storage unit 345.

The system 300 also includes an upstream-downstream feed-forward unit 360. The upstream-downstream feed-forward unit 360 is capable of performing a qualitative analysis of the data from the upstream metrology tool 350a. The qualitative analysis may be performed using a fuzzy logic controller, neural network, and/or qualitative transfer functions. In one embodiment, a qualitative transfer function, which may be similar to a fuzzy logic system, may rely on the notion that those with domain knowledge are able to describe the relationships within a system substantially completely. However, this may be performed without substantial direct knowledge of detailed models and coefficients. In one embodiment, a qualitative transfer function may be generated using a system of relationships that capture correlation between parameters, including the sign (+/−) of the relationship. These relationships may be aggregated into a qualitative transfer function and employed to predict system response without the requiring rigorous process modeling. In one embodiment, fuzzy logic may refer to a set of rules. In one embodiment, a qualitative transfer function may refer to a set of variable correlations.

The upstream-downstream feed-forward unit 360 then categorizes the condition of the semiconductor wafers 105 resulting from the upstream process into various groups. Thereafter, particular recipes and/or control parameters may be selected to perform a downstream process in the downstream processing tool 310b. In one embodiment, the upstream-downstream feed-forward unit 360 may be integrated into the process controller 320. A more detailed illustration and description of the upstream-downstream feed-forward unit 360 is provided in FIG. 4 and accompanying description below.

Various elements of the system 300, such as the process controller 320 and the upstream-downstream feed-forward unit 360, may be software, hardware, or firmware unit(s) that are standalone units or may be integrated into a computer system associated with the system 300. Furthermore, the various components represented by the blocks illustrated in FIG. 3 may communicate with one another via a system communications line 315. The system communications line 315 may be a computer bus link, a dedicated hardware communications link, a telephone system communications link, a wireless communications link, or other communication links that may be implemented by those skilled in the art having benefit of the present disclosure.

Figure 4:
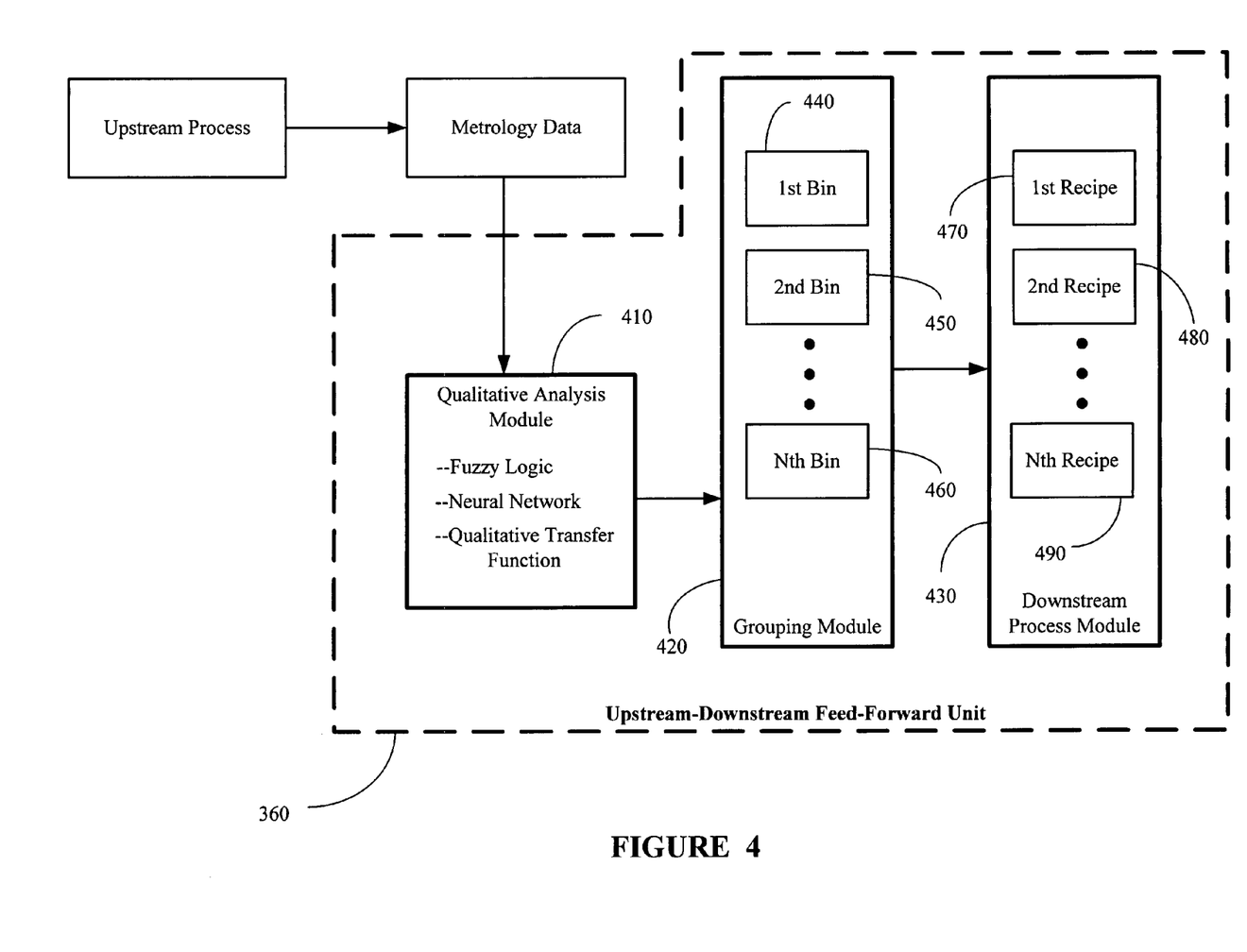
FIG. 4 illustrates a more detailed block diagram representation of an upstream-downstream feed-forward unit of FIG. 3, in accordance with one illustrative embodiment of the present invention.

Turning now to FIG. 4, a more detailed block diagram of the upstream-downstream feed-forward unit 360 is illustrated. The upstream-downstream feed-forward unit 360 comprises a qualitative analysis module 410, a grouping module 420, and a downstream process module 430. The qualitative analysis module 410, the grouping module 420, and the downstream process module 430 may be software, hardware, or firmware unit(s) that are standalone units or may be integrated into a computer system associated with the system 300.

The qualitative analysis module 410 is capable of performing a qualitative analysis of the metrology data relating to the upstream process performed on the semiconductor wafer 105. The qualitative analysis module 410 may comprise a fuzzy logic controller, a neural network controller, a qualitative transfer function controller, and/or any combination therein. The fuzzy logic, the neural network, and the qualitative transfer function controllers may analyze various quantitative measurements, in addition to performing a qualitative analysis of those measurements, and combine them with various rules and decision-making protocols programmed into the qualitative analysis module 410. Rather than feed-forwarding a simple qualitative numeric measurement (e.g., thickness measurements into a CMP polisher process or an etch process) an overall qualitative view of the one or more features (e.g., one or more patterns) of the semiconductor wafers 105, and a judgment relating to the measurements and the features may be provided by the qualitative analysis module 410. For example, if the downstream process is a copper polishing process, various factors from previous processes may be qualitatively analyzed to select a recipe that provides for improved feed-forward control of a downstream process, i.e., the copper polish process.

For instance, in a damascene process, a plurality of trenches are formed in a layer of insulating material, e.g., silicon dioxide. Thereafter, copper is deposited (typically by an electroplating process) in the trenches and above the surface of the insulating layer. Then, the copper is polished away so what remains include copper lines positioned in the trenches in the dielectric layer. Dishing and erosion problems may occur during the polishing process. Dishing is a problem associated with an overall depression of the wafer surface, which may occur during copper polishing. Erosion relates to an excessive etching-away of the copper into a trench. Both dishing and erosion problems are affected by the polish process itself. Additionally, dishing and erosion problems may also be influenced by the deposition characteristics, as well as the actual patterning of the trenches formed by upstream processes. Qualitatively examining the overall trench depth thickness, the uniformity of the thickness after the etch process that formed the trenches, as well as the deposition quality from the copper deposition, may provide an overall qualitative indication of the type of removal requirements that should be implemented when performing the downstream copper polishing process. A more accurate recipe chosen for the copper polishing process may provide for a reduced amount of residual copper as well as reduced dishing and erosion problems. Therefore, using the qualitative analysis performed by the upstream-downstream feed-forward unit 360, a more accurate recipe may be selected to perform the downstream copper polishing process.

The inputs to the neural network, fuzzy logic, or to the qualitative transfer function controllers associated with the qualitative analysis module 410 may include various factors, such as the trench depth, copper deposition data, mean thickness of various deposits, the center-to-edge slope of the deposition thickness, and/or other quantitative metrics. Based upon these qualitative metrics, as well as algorithms influenced by experience with processing and domain knowledge, which are programmed into the qualitative analysis module 410, a relationship between wafer characteristics resulting from an upstream process, and the final recipe used to perform a downstream process may be developed. During a copper polishing process, the goal of performing the qualitative analysis process includes reducing the residual copper, as well as reducing the possibility of dishing and erosion may be achieved by choosing a particular recipe based upon the qualitative analysis of the upstream process (es).

The qualitative analysis module 410 may group the characteristics of the features (e.g., patterns or other features) of the wafers processed by an upstream process into different groups or categories. The grouping module 420 is capable of receiving the qualitative analysis data relating to the upstream process from the qualitative analysis module 410. The grouping module 420 is capable of grouping the wafer characteristics from the qualitative analysis module 410 into different groups. The grouping module 420 may comprise a first bin 440, a second bin 450, through an $N^{th}$ bin 460, where N is any integer. The characteristics of the semiconductor wafers 105 processed by the upstream processes may be based upon a qualitative analysis and may be grouped into one of the first bin 440 through the $N^{th}$ bin 460. Based upon the grouping of the characteristics of the semiconductor wafers 105, the downstream process module 430 may select a particular set of control parameters or recipes to perform the downstream process. In one embodiment, the downstream process module 430 comprises a first recipe 470, a second recipe 480, through an $N^{th}$ recipe 490. In one embodiment, the first recipe 470 may correlate respectively to the first bin 440, the second recipe 480 may correlate to the second bin 450, and the $N^{th}$ recipe 490 may respectively correlate to the $N^{th}$ bin 460. Therefore, based upon the grouping of the characteristics of the semiconductor wafers 105 processed by the upstream process, as a result of the qualitative analysis and grouping of wafer characteristics into the first bin 440 through the $N^{th}$ bin 460, a first recipe 470 through an N$^{th}$ recipe 490 is respectively selected for performing the downstream process. Therefore, regarding the example provided above, by qualitatively analyzing the various metrics and performing other rule-based and decision-based processes described above, a more accurate selection of a particular recipe to perform the downstream copper polishing process that provides a reduction in residual copper, and a reduction in the amount of dishing and erosion, may be performed.

Figure 5:
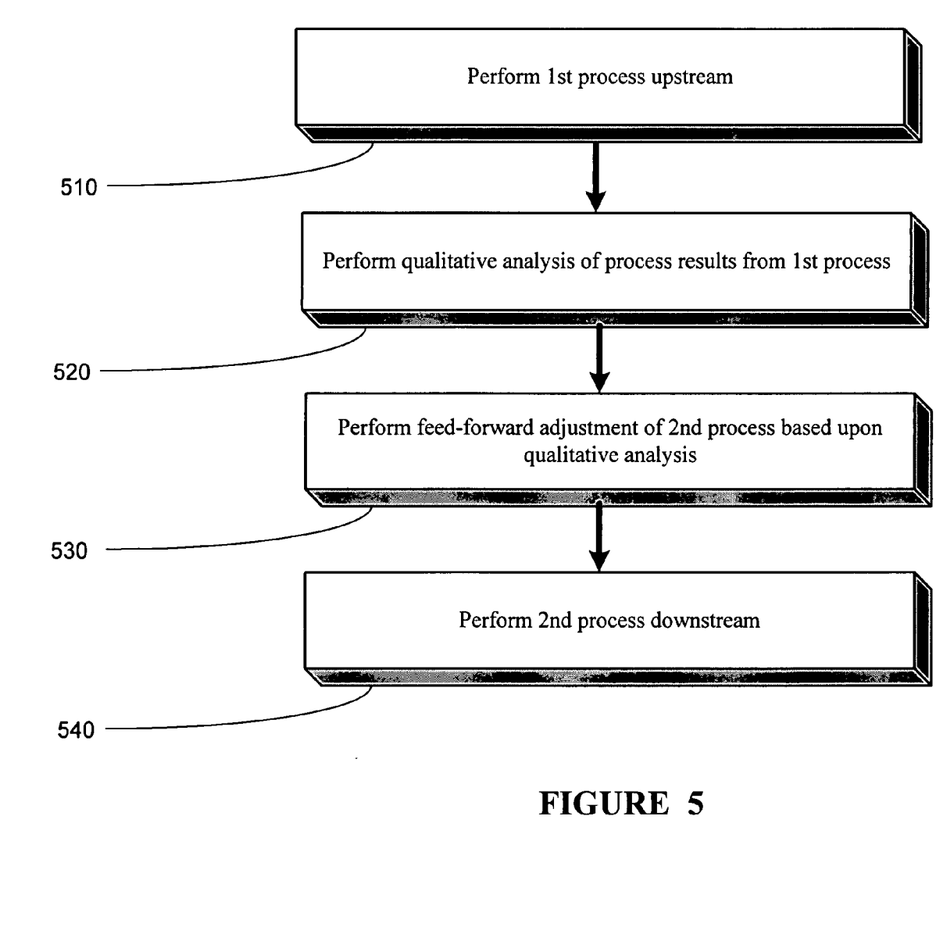
FIG. 5 illustrates a flowchart depiction of a method in accordance with one illustrative embodiment of the present invention.

Turning now to FIG. 5, a flowchart depiction of the methods associated with embodiments of the present invention is illustrated. The system 300 may perform a first process, which is an upstream process (block 510). For example, the first process may be a copper deposition process or an etch process. As described above, the system 300 then performs a qualitative analysis of the process results from the first process (block 520). Based upon the qualitative analysis, the system 300 provides a grouping of the characteristics associated with the semiconductor wafers 105 processed by the first upstream process and selects a recipe or process control that correlates to the particular grouping. The qualitative analysis may be performed by a fuzzy logic controller, neural network controller, and/or a qualitative transfer function controller to perform an analysis of the metric measurements as well as perform a rule-based and/or a decision-based program execution to perform an overall qualitative analysis of the characteristics (e.g., overall patterns on the wafer) of the wafer processed by the first process. A more detailed description of the methods associated with the qualitative analysis described in block 520 is provided in FIG. 6 and accompanying description below.

Based on the qualitative analysis described in block 520, the system 300 performs a feed-forward adjustment of a second process, which is a downstream process (block 530). Performing the feed-forward adjustment includes selecting a particular recipe that is associated with the grouping of the characteristics resulting from performing the qualitative analysis performed relating to the upstream process. Based upon the grouping resulting from the qualitative analysis, a feed-forward adjustment is made by selecting a particular recipe or a group of process controls, which is used to perform a second (downstream) process based upon the feed-forward adjustment (block 540). As a result of using the qualitative analysis, improved results from the second (downstream) process may be realized.

The downstream metrology tool 350b may then acquire metrology data relating to the downstream process and this data may again be used by the qualitative analysis module 410 in the upstream-downstream feed-forward unit 360 to perform a second qualitative analysis. This second qualitative analysis may be used to provide a feed-forward adjustment to yet another subsequent downstream process. This process may be repeated until substantially all downstream processes have been performed upon the semiconductor wafers 105. In an alternative embodiment, the qualitative analysis provided by embodiments of the present invention may be performed only on selective upstream/downstream process combinations.

Figure 6:
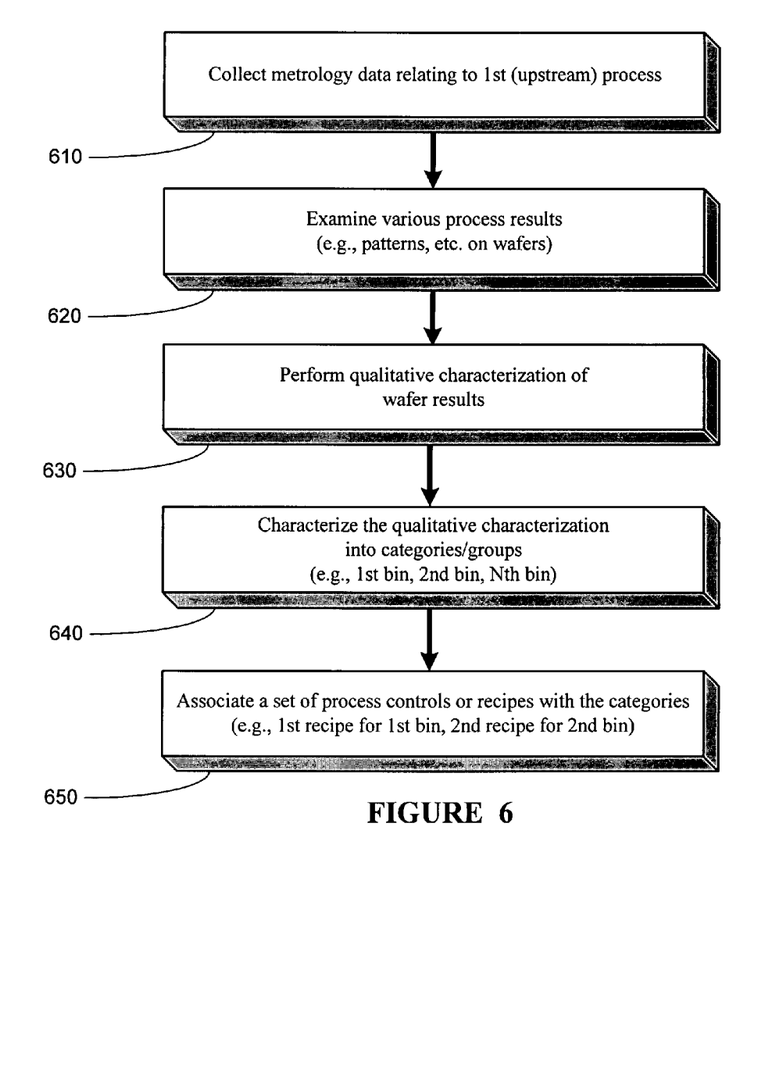
FIG. 6 illustrates a more detailed flowchart depiction of a method of performing a qualitative analysis, as indicated in FIG. 5, in accordance with one illustrative embodiment of the present invention.

Turning now to FIG. 6, a flowchart depiction of steps associated with performing the qualitative analysis described in block 520 of FIG. 5 is illustrated. The system 300 may collect metrology data relating to the first process (e.g., the upstream process) (block 610). Various semiconductor wafers 105 that were processed by the first process may be analyzed by the upstream metrology tool 350a so that various process metrics may be measured. These metrics may include trench depth, copper deposition, thickness, mean thickness of various materials deposited on the semiconductor wafers 105, the center-to-edge slope of the deposition thickness, and the like. The system 300 may also examine various process results that appear on the semiconductor wafers 105, such as various patterns, and the like (block 620).

Based upon the data provided by the steps described in blocks 610 and 620, along with other decision-making and rule-based programming, the system 300 may perform a qualitative analysis or characterization of the results of processing the semiconductor wafers 105 (block 630). The qualitative characterization may include an overall assessment of the characteristics of the processed semiconductor wafers 105. Based upon the qualitative characterization, the system 300 may categorize the quality characteristics into various categories/groups (block 640). The semiconductor wafers 105 characteristics may be grouped into a first bin 440, a second bin 450, through an N$^{th}$ bin 460. Based upon the characterization of the semiconductor wafer 105 results, the system 300 may then associate a set of process control parameters or recipes that correlate with the various categories or groupings. Therefore, a first recipe 470 may be associated with a first bin 440, and an N$^{th}$ recipe 490 may be associated with an N$^{th}$ bin 460. Based upon the grouping, an efficient method of retrieving a recipe to perform a downstream process is provided. Therefore, using the qualitative characterization provided by embodiments of the present invention, a more accurate and efficient feed-forward adjustment of a downstream process may be achieved in an automated fashion.

Utilizing various embodiments of the present invention, an improved overall assessment of a particular upstream process is qualified. Using this assessment, a grouping is performed so that particular recipes or sets of control parameters may be automatically and efficiently retrieved to perform a downstream process. Therefore, a more effective and accurate feed-forward adjustment may be performed on a downstream process to achieve more accurate semiconductor wafer 105 characteristics and improved yields.

The principles taught by the present invention can be implemented in an Advanced Process Control (APC) Framework, such as a Catalyst system formerly offered by KLA Tencor, Inc. The Catalyst system uses Semiconductor Equipment and Materials International (SEMI) Computer Integrated Manufacturing (CIM) Framework compliant system technologies, and is based on the Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI. The APC framework is a preferred platform from which to implement the control strategy taught by the present invention. In some embodiments, the APC framework can be a factory-wide software system; therefore, the control strategies taught by the present invention can be applied to virtually any of the semiconductor manufacturing tools on the factory floor. The APC framework also allows for remote access and monitoring of the process performance. Furthermore, by utilizing the APC framework, data storage can be more convenient, more flexible, and less expensive than local drives. The APC framework allows for more sophisticated types of control because it provides a significant amount of flexibility in writing the necessary software code.

Deployment of the control strategy taught by the present invention onto the APC framework could require a number of software components. In addition to components within the APC framework, a computer script is written for each of the semiconductor manufacturing tools involved in the control system. When a semiconductor manufacturing tool in the control system is started in the semiconductor manufacturing fab, it generally calls upon a script to initiate the action that is required by the process controller, such as the overlay controller. The control methods are generally defined and performed in these scripts. The development of these scripts can comprise a significant portion of the development of a control system. The principles taught by the present invention can be implemented into other types of manufacturing frameworks.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
   performing a first process on a workpiece;
   performing a qualitative analysis relating to said first process performed on said workpiece, said qualitative analysis comprising analyzing at least one metrology measurement relating to said first process and analyzing a workpiece feature, to evaluate a characteristic of said workpiece; and
   selecting a process control parameter for performing a second process on said workpiece based upon said qualitative analysis;
   wherein performing said qualitative analysis relating to said first process performed on said workpiece further comprises categorizing a characteristic of said workpiece into one of a plurality of groups, associating a plurality of recipes respectively to each of said groups, and selecting one of said plurality of recipes based upon said categorizing of said characteristic of said workpiece;
   wherein selecting one of said plurality of recipes further comprises selecting a recipe that at least partially causes a reduction in copper residue during a copper polishing process.

2. The method of claim 1, wherein performing said first process step upon said workpiece further comprises performing said first process step on a semiconductor wafer.

3. The method of claim 1, further comprising performing said first process based upon said selected process control parameter on at least an additional workpiece.

4. The method of claim 1, wherein performing said qualitative analysis relating to said first process performed upon said workpiece further comprises performing an analysis of said at least one metrology measurement and said workpiece feature using a rule-based algorithm.

5. The method of claim 1, wherein performing said qualitative analysis relating to said first process performed upon said workpiece further comprises performing an analysis of said at least one metrology measurement and said workpiece feature using a decision-based algorithm.

6. The method of claim 1, wherein performing said qualitative analysis relating to said first process performed upon said workpiece further comprises performing said qualitative analysis using a neural network.

7. The method of claim 1, wherein performing said qualitative analysis relating to said first process performed upon said workpiece further comprises performing said qualitative analysis using a fuzzy logic controller.

8. The method of claim 1, wherein performing said qualitative analysis relating to said first process performed upon said workpiece further comprises performing said qualitative analysis using a qualitative transfer function.

9. The method of claim 1, wherein performing said qualitative analysis relating to said first process performed upon said workpiece further comprises analyzing a plurality of metrology measurements from said workpiece.

10. The method of claim 9, wherein analyzing a plurality of metrology measurements from said workpiece further comprises analyzing at least one of a trench depth formed on said workpiece, deposition thickness associated with a deposition layer on said workpiece, a mean thickness associated with a deposition layer on said workpiece, and a center to edge slope of a deposition thickness associated with a deposition layer on said workpiece.

11. The method of claim 1, wherein analyzing said workpiece feature further comprises analyzing a pattern formed in said workpiece.

12. The method of claim 1, wherein performing said qualitative analysis relating to said first process performed on said workpiece further comprises adjusting one of said plurality of recipes based upon said categorizing of said characteristic of said workpiece.

13. The method of claim 1, wherein performing said qualitative analysis relating to said first process performed on said workpiece further comprises performing said qualitative analysis on a wafer-to-wafer basis.

14. The method of claim 1, wherein selecting one of said plurality of recipes further comprises selecting a recipe that results in reduced dishing.

15. The method of claim 1, wherein selecting one of said plurality of recipes further comprises selecting a recipe that results in reduced erosion.

16. The method of claim 1, further comprises performing said second process upon said workpiece based upon said selecting one of said plurality of said recipes.

17. The method of claim 1, wherein performing said first process further comprises performing an etch process.

18. The method of claim 1, wherein performing said first process further comprises performing a deposition process.

19. The method of claim 1, wherein performing said second process further comprises performing a copper polishing process.

20. The method of claim 1, wherein said second process is a downstream process relative to said first process.

21. The method of claim 1, wherein said qualitative analysis comprises analyzing at least one of a non-numeric process parameter and a business rule.

22. The method of claim 1, wherein performing said qualitative analysis further comprises at least one of determining a qualitative description of workpiece quality, determining a description of the spatial uniformity of one or more post-process workpiece characteristics, aggregating a plurality of workpieces into like groups based upon the one or more post-process characteristics, and considering at least one business rule.

23. A method, comprising:
   performing a first process on a workpiece;
   performing a qualitative analysis relating to said first process performed on said workpiece, said qualitative analysis comprising analyzing at least one metrology measurement relating to said first process and analyzing a workpiece feature to evaluate a characteristic of said workpiece;

associating a process recipe to said characteristic of said workpiece;
using said process recipe to perform a second process on said workpiece; and
selecting a process control parameter for performing said second process on said workpiece based upon said qualitative analysis;
wherein performing said qualitative analysis relating to said first process performed on said workpiece further comprises categorizing a characteristic of said workpiece into one of a plurality of groups, associating a plurality of recipes respectively to each of said groups, and selecting one of said plurality of recipes based upon said categorizing of said characteristic of said workpiece; wherein selecting one of said plurality of recipes further comprises selecting a recipe that at least partially causes a reduction in copper residue during a copper polishing process.

24. The method of claim 23, further comprising performing said second process based upon said process recipe on at least an additional workpiece.

25. A method, comprising:
performing a first process on a workpiece;
performing a qualitative analysis relating to said first process performed on said workpiece, said qualitative analysis comprising analyzing at least one metrology measurement relating to said first process and analyzing a workpiece feature to evaluate a characteristic of said workpiece;
categorizing said workpiece based upon said characteristic of said workpiece to at least one of a first category and a second category;
selecting a process control parameter for performing a second process on said workpiece based upon said qualitative analysis;
selecting at least one of a first process recipe and a second process recipe respectively corresponding to first and second categories to provide a selected process recipe; and
using said selected process recipe to perform a said second process upon said workpiece,
wherein performing said qualitative analysis relating to said first process performed on said workpiece further comprises categorizing a characteristic of said workpiece into one of a plurality of groups, associating a plurality of recipes respectively to each of said groups, and selecting one of said plurality of recipes based upon said categorizing of said characteristic of said workpiece; wherein selecting one of said plurality of recipes further comprises selecting a recipe that at least partially causes a reduction in copper residue during a copper polishing process.

26. The method of claim 25, further comprising performing said second process comprised of said selected process control parameter on at least an additional workpiece.

27. An apparatus, comprising:
means for performing a first process on a workpiece;
means for performing a qualitative analysis relating to said first process performed upon said workpiece, said qualitative analysis comprises analyzing at least one metrology measurement relating to said first process and analyzing a workpiece feature to evaluate a characteristic of said workpiece; and
means for selecting a process control parameter for performing a second process upon said workpiece based upon said qualitative analysis wherein performing said qualitative analysis relating to said first process performed on said workpiece further comprises categorizing a characteristic of said workpiece into one of a plurality of groups, associating a plurality of recipes respectively to each of said groups, and selecting one of said plurality of recipes based upon said categorizing of said characteristic of said workpiece; wherein selecting one of said plurality of recipes further comprises selecting a recipe that at least partially causes a reduction in copper residue during a copper polishing process.

28. A system, comprising:
a first processing tool to perform a first process upon a workpiece;
a metrology tool to acquire metrology data relating to said first process performed on said workpiece to provide at least one metrology measurement;
a second processing tool to perform a second process upon said workpiece; and
a process controller operatively coupled to said first and second processing tools, said process controller to qualitatively analyze said metrology measurement relating to said first process and analyzing a workpiece feature to evaluate a characteristic of said workpiece, said process controller also to select a process control parameter for performing said second process upon said workpiece based upon said characteristic of said workpiece;
wherein performing said qualitative analysis relating to said first process performed on said workpiece further comprises categorizing a characteristic of said workpiece into one of a plurality of groups, associating a plurality of recipes respectively to each of said groups, and selecting one of said plurality of recipes based upon said categorizing of said characteristic of said workpiece; wherein selecting one of said plurality of recipes further comprises selecting a recipe that at least partially causes a reduction in copper residue during a copper polishing process.

29. The system of claim 28, wherein said workpiece is a semiconductor wafer.

30. The system of claim 28, wherein said process controller being further operable to categorize said characteristic of said workpiece into a first category and correlate said first category to a first recipe for controlling said second process.

31. The system of claim 28, wherein said process controller further comprising a upstream-downstream feed-forward unit to perform a qualitative analysis of said first process based upon said metrology measurement and said workpiece feature to evaluate said characteristic of said workpiece.

32. The system of claim 31, wherein said upstream-downstream feed-forward unit further comprises a fuzzy logic controller to perform said qualitative analysis of said first process.

33. The system of claim 31, wherein said upstream-downstream feed-forward unit further comprises a qualitative transfer function controller to perform said qualitative analysis of said first process.

34. The system of claim 31, wherein said upstream-downstream feed-forward unit further comprises a neural network controller to perform said qualitative analysis of said first process.

35. The system of claim 28, further comprising a database unit to store said at least one of metrology data, said data relating to said characteristic of said workpiece.

36. The system of claim 28, wherein said first processing tool is an upstream processing tool and said second processing tool is a downstream processing tool relative to said upstream processing tool.

37. A computer readable program storage device encoded with instructions that, when executed by a computer, performs a method, comprising:
performing a first process on a workpiece;
performing a qualitative analysis upon said workpiece relating to said first process, said qualitative analysis comprises analyzing at least one metrology measurement relating to said first process and analyzing a workpiece feature to evaluate a characteristic of said workpiece; and
selecting a process control parameter for performing a second process upon said workpiece based upon said qualitative analysis;
wherein performing said qualitative analysis relating to said first process performed on said workpiece further comprises categorizing a characteristic of said workpiece into one of a plurality of groups, associating a plurality of recipes respectively to each of said groups, and selecting one of said plurality of recipes based upon said categorizing of said characteristic of said workpiece; wherein selecting one of said plurality of recipes further comprises selecting a recipe that at least partially causes a reduction in copper residue during a copper polishing process.

38. The computer readable program storage device encoded with instructions that, when executed by a computer, performs the method of claim 37, wherein performing said qualitative analysis upon said workpiece further comprises performing an analysis of said at least one metrology measurement and said workpiece feature using a rule-based algorithm.

39. The computer readable program storage device encoded with instructions that, when executed by a computer, performs the method of claim 37, wherein performing said qualitative analysis upon said workpiece further comprises performing an analysis of said at least one metrology measurement and said workpiece feature using a decision-based algorithm.

40. The computer readable program storage device encoded with instructions that, when executed by a computer, performs the method of claim 37, wherein performing said qualitative analysis upon said workpiece further comprises performing said qualitative analysis using a qualitative transfer function.

41. The computer readable program storage device encoded with instructions that, when executed by a computer, performs the method of claim 37, wherein performing said qualitative analysis upon said workpiece further comprises analyzing a plurality of metrology measurements from said workpiece.

42. The computer readable program storage device encoded with instructions that, when executed by a computer, performs the method of claim 41, wherein analyzing a plurality of metrology measurements from said workpiece further comprises analyzing at least one of a trench depth formed on said workpiece, deposition thickness associated with a deposition layer on said workpiece, a mean thickness associated with a deposition layer on said workpiece, and a center to edge slope of a deposition thickness associated with a deposition layer on said workpiece.

43. The computer readable program storage device encoded with instructions that, when executed by a computer, performs the method of claim 37, analyzing said workpiece feature further comprises analyzing a pattern formed in said workpiece.

44. The computer readable program storage device encoded with instructions that, when executed by a computer, performs the method of claim 37, wherein performing said qualitative analysis upon said workpiece further comprises categorizing a characteristic of said workpiece into one of a plurality of groups.

45. The computer readable program storage device encoded with instructions that, when executed by a computer, performs the method of claim 44, wherein performing said qualitative analysis upon said workpiece further comprises associating a plurality of recipes respectively to each of said groups.

46. The computer readable program storage device encoded with instructions that, when executed by a computer, performs the method of claim 45, wherein performing said qualitative analysis upon said workpiece further comprises selecting one of said plurality of recipes based upon said categorizing said characteristic of said workpiece.

47. The computer readable program storage device encoded with instructions that, when executed by a computer, performs the method of claim 37, wherein performing said qualitative analysis further comprises at least one of determining a qualitative description of workpiece quality, determining a description of the spatial uniformity of one or more post-process workpiece characteristics, aggregating a plurality of workpieces into like groups based upon the one or more post-process characteristics, and considering at least one business rule.

\* \* \* \* \*